United States Patent [19]
Muralidharan et al.

[11] Patent Number: 4,617,168
[45] Date of Patent: Oct. 14, 1986

[54] APPARATUS AND METHOD FOR REACTOR MONITORING

[75] Inventors: Ramachandran Muralidharan; Atambir S. Rao, both of San Jose, Calif.

[73] Assignee: General Electric Company, San Jose, Calif.

[21] Appl. No.: 601,704

[22] Filed: Apr. 18, 1984

[51] Int. Cl.⁴ ............................................. G21C 17/00
[52] U.S. Cl. ................................................... 376/247
[58] Field of Search .................. 376/247, 450; 73/299, 73/301

[56] References Cited

U.S. PATENT DOCUMENTS

| | | | |
|---|---|---|---|
| 3,128,233 | 4/1964 | Kuerzel | 376/247 |
| 3,296,864 | 1/1967 | Kealy et al. | 376/450 |
| 3,625,815 | 12/1971 | Fishman | 376/247 |
| 3,812,719 | 5/1974 | Shopsky | 374/201 |
| 4,394,346 | 7/1983 | Morooka | 376/247 |
| 4,405,559 | 9/1983 | Tokarz | 376/247 |
| 4,414,177 | 11/1983 | Tokarz | 376/247 |
| 4,495,137 | 1/1985 | Otsubo | 376/247 |

FOREIGN PATENT DOCUMENTS

| | | | |
|---|---|---|---|
| 1242697 | 8/1960 | France | 376/247 |
| 1105477 | 3/1968 | United Kingdom | 376/247 |

Primary Examiner—Salvatore Cangialosi
Attorney, Agent, or Firm—Ivor J. James, Jr.; Raymond G. Simkins

[57] ABSTRACT

A method and apparatus are disclosed for monitoring the operation of a boiling water nuclear reactor for the occurrence of a superheated condition. The invention provides redundant monitoring of the level of coolant water in the reactor independently of existing water level gauges. A closed system vapor pressure device, located outside the reactor, probes the temperature of the reactor steam. The temperature of the steam determines the internal vapor pressure developed in the device, the latter being directly compared, externally of the reactor, to the steam pressure in the reactor vessel. The differential between the compared pressures is an indication of a superheated reactor condition and, hence, of a low water level in the vessel.

9 Claims, 2 Drawing Figures

APPARATUS AND METHOD FOR REACTOR MONITORING

The present invention relates in general to monitoring the operation of a nuclear reactor and more specifically to a method and apparatus for monitoring a boiling water nuclear reactor for the occurrence of an abnormal condition.

BACKGROUND OF THE INVENTION

An important requirement for the safe operation of a nuclear reactor is the need to keep the nuclear fuel below a certain critical temperature. In a boiling water nuclear reactor, this is accomplished by maintaining a sufficient inventory of coolant water in the reactor vessel and coolant flow through the fuel bundles. Insufficient cooling can cause damage to the cladding of the nuclear fuel rods. Thus, is it imperative that the coolant water level in the reactor vessel be continuously monitored.

In existing boiling water reactors, monitoring of the coolant water level is conventionally carried out by level gauges located in the downcomer region of the reactor. Although such gauges provide a reliable indication of the water level, the potential damage which may result if the water level were to fall too far makes redundant monitoring of the water level useful.

A lowering of the level of the coolant water in the reactor vessel may be due to a number of causes, e.g., through failure of the feedwater system, or if there is a leak through which coolant water is lost, or through a loss of steam. Unless the water inventory is replenished by an emergency or make-up water supply, the water level will continue to fall as coolant water continues to evaporate to form steam. Eventually, the upper portions of the fuel bundles will become overheated and the steam in contact with the overheated portions will become superheated.

Present day reactors incorporate number of safety features to indicate the onset of such a situation and to prevent it from occurring, or from progressing once started. For example, the aforesaid monitoring of the water level by means of level gauges and an emergency supply of coolant water are standard features in present day boiling water nuclear reactors. However, the detection of an abnormal condition in such a reactor is largely dependent on the proper operation of the level gauges. Thus, the potential consequences of the loss of a substantial amount of coolant water justifies redundant monitoring to detect the occurrence of an abnormal reactor condition.

In general, the presence of superheated steam in the reactor vessel indicates the existence of an abnormal reactor condition, usually due to a low water level in the reactor. A superheated condition is said to occur when the water and steam in the reactor vessel no longer exist in a saturation condition. In accordance with a commonly used technique for inferring the existence of a superheated condition in a boiling water reactor, and thus to provide redundancy of the monitoring process, a thermocouple, or the like, is exposed to the temperature of the steam in the steam exit line of the reactor. When the temperature sensed by the thermocouple exceeds a predetermined limit, a superheated condition, and hence an abnormally low water level in the reactor core, are assumed to exist. A disadvantage of this technique is that the high temperature of the steam and its radioactivity tend to deteriorate the dissimilar metals that make up the thermocouple and to accelerate the aging of the latter. Under these conditions spurious readings may be obtained, requiring frequent recalibration and accelerated replacement of the thermocouple.

To provide a more reliable determination of a superheated reactor condition, the equipment employed must be simple and it must not be degradable by the superheated, radioactive steam in contact therewith. Further, such equipment is preferably located outside the reactor, so as to be easily available for servicing. Finally, for true redundancy all monitoring performed with such equipment must be independent of the monitoring provided by the use of coolant water level gauges in the downcomer region of the reactor.

OBJECTS OF THE INVENTION

It is an object of the present invention to provide a new and improved method and apparatus for reliably and redundantly monitoring the operation of a boiling water nuclear reactor for the occurrence of an abnormal condition.

It is another object of the present invention to provide a new and improved method and apparatus for monitoring the operation of boiling water nuclear reactor for the occurrence of a superheated condition.

It is a further object of the present invention to provide a new and improved method and apparatus for monitoring the operation of a boiling water nuclear reactor externally of the reactor, for the occurrence of a superheated condition inside.

It is yet another object of the present invention to provide a new and improved method and apparatus for monitoring the water level of a boiling water nuclear reactor externally of the reactor, independently of any other water level monitoring operation concurrently carried out.

It is still a further object of the present invention to provide new and improved apparatus for monitoring the temperature of steam in a boiling water nuclear reactor externally of the reactor, which directly references the reactor steam pressure.

It is still another object of the present invention to provide new and improved apparatus for monitoring the temperature of steam in a boiling water nuclear reactor which is relatively simple in construction, easily serviced and which is accessible externally of the reactor.

It is yet a further object of the present invention to provide new and improved apparatus for monitoring the temperature of steam in a boiling water nuclear reactor which is reliable and capable of withstanding radioactive steam at high temperatures without degradation of performance, or the need for frequent recalibration.

SUMMARY OF THE INVENTION

In accordance with the method and apparatus which constitute the present invention, the condition of a boiling water nuclear reactor is monitored by means of a fluid-holding, closed system measuring device, e.g., a vapor pressure device, in which a volatile liquid produces a vapor pressure which corresponds to the temperature of the steam in the steam exit line of the reactor vessel. Since the steam line taps the reactor vessel, the tapped steam has approximately the same temperature as the steam inside the reactor.

Normally, the steam in the nuclear reactor is in a saturated state. This saturated steam is maintained at a substantially constant pressure due to the fact that the coolant water produces steam at the same rate at which the steam is withdrawn through the steam exit line. Likewise, in the closed system vapor pressure device the steam is in a saturated state. Here however, since the system is closed, the internal vapor pressure depends on the temperature to which the device is subjected.

If the reactor water level falls sufficiently, the steam which is heated by the overheated portions of the fuel will become superheated, i.e., its temperature will rise above the temperature of the saturated steam. Concurrently, the internal pressure developed in the vapor pressure device will rise since it corresponds substantially to the temperature of the superheated steam in the reactor vessel. Hence, a continuing comparison of the tapped steam pressure and of the internal vapor pressure is effective to monitor the reactor for abnormal conditions, such as the existence of a superheated condition and, thus, an abnormally low water level in the reactor vessel.

DESCRIPTION OF THE INVENTION

Figure 1:
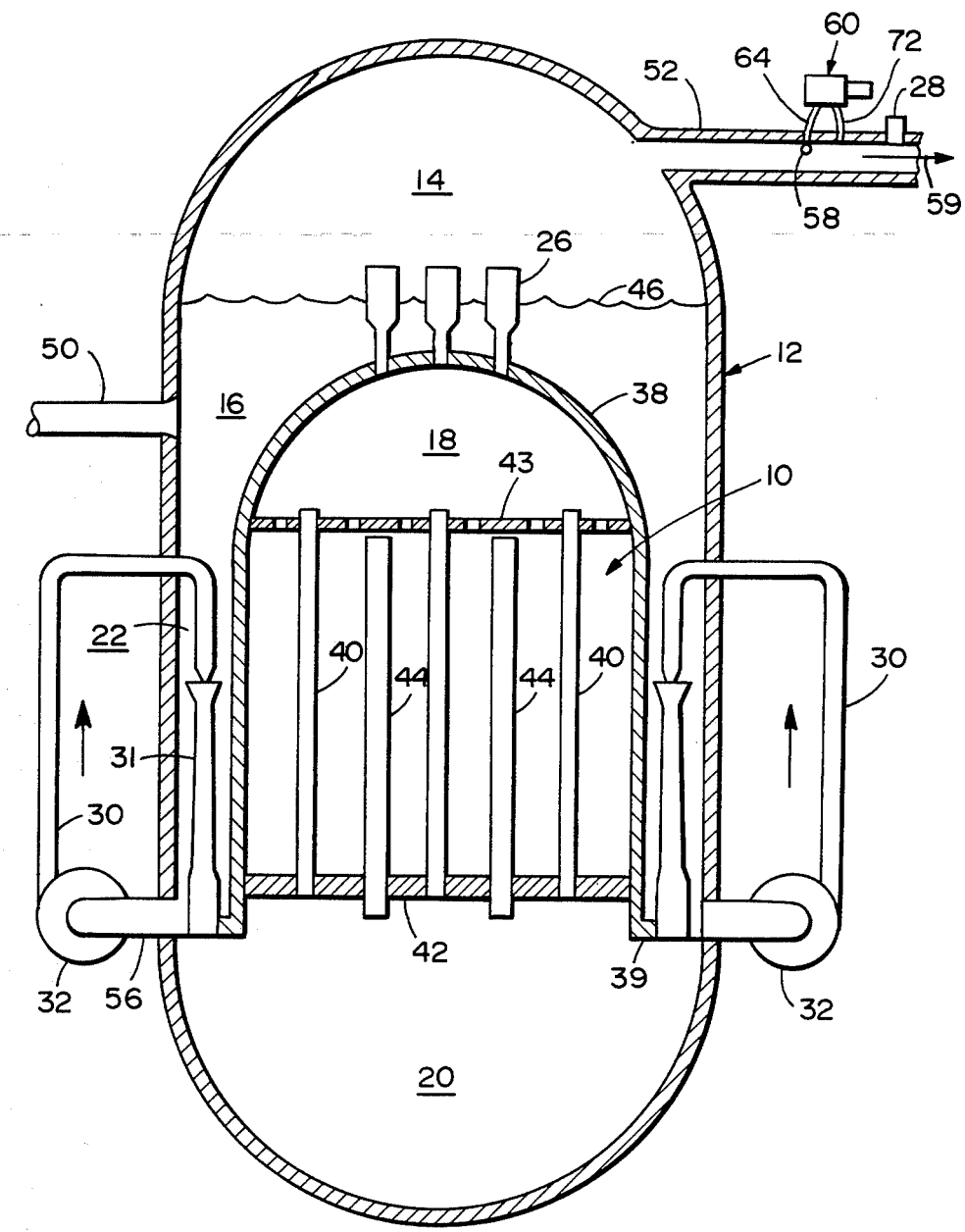
FIG. 1 is a cross sectional view of an example boiling water nuclear reactor.

Referring now to FIG. 1, there is shown a typical boiling water nuclear reactor, which includes a reactor core 10 within a reactor pressure vessel 12. Reactor vessel 12 includes a steam dome region 14, a mixing plenum region 16 and a downcomer region 22. A plurality of steam separators 26 are located in mixing plenum region 16. A pressure relief safety valve 28 is located in the steam line 52 and allows the steam to escape from vessel 12 if a predetermined pressure safety threshold is exceeded. Steam from the safety relief valve 28 is normally fed through suitable piping to a suppression pool (not shown).

The reactor further includes a plurality of recirculation loops 30, only two being shown for the sake of clarity of illustration. Each loop 30 contains a pump 32 which circulates the water in downcomer region 22 to a lower plenum region 20. Specifically, water from the downcomer region enters each pump through pump input 56 and, after passing through the recirculation loop 30, is forced into lower plenum input pipes 31 (which may be jet pumps) and from there into the lower plenum region 20. Under normal operating conditions, the level of the coolant water in vessel 12 is maintained about at a level indicated by the wavy line 46.

A shroud head 38 includes a horizontal lip 39 which forms a watertight joint with the wall of vessel 12. Shroud head 38 separates steam dome region 14, mixing plenum region 16 and downcomer region 22 from the reactor core 10, as well as from the lower plenum region 20. At its upper portion, the shroud head defines an upper plenum region 18, which communicates with steam separators 26. The fuel core includes nuclear fuel bundles 40, supported between lower and upper core grids 42 and 43, and control rods 44 which are operable to regulate the reactivity of the fuel and hence the amount of heat given off by fuel bundles 40.

During operation, water in plenum 20, pressurized by the recirculation loops 30, is forced upward through fuel bundles 40 wherein some of the water is evaporated by the heat given off by the fuel to form a steam-water mixture in plenum 18.

This steam-water mixture enters steam separators 26 wherein the water is removed and returned to the region 16 and the steam passes into the steam dome region 14. The steam in region 14 is tapped by being piped out of vessel 12 through steam exit line 52 to perform useful work, e.g., to drive a turbine. The water lost from vessel 12 in the form of steam is continuously replenished by pressurized water from a feedwater inlet pipe 50. The pressurized water consists largely of condensed steam that has given up most of its energy in performing useful work, as well as added water to replenish what may be lost in the process. Thus, water level 46 does not vary significantly during normal operation. Similarly, a relatively constant pressure and temperature are maintained in the reactor vessel during normal operating conditions.

A boiling water nuclear reactor operates within predetermined steam pressure and temperature limits. The pressure range in the reactor vessel is controlled by a pressure regulator. In an actual example, the pressure is allowed to vary between 1040 and 1060 psi, while the temperature varies between 540° to 550° F.

In the abnormal event of failure of the reactor cooling systems of sufficient magnitude, the water level 46 will drop. Such abnormal events may include failure of the feedwater system to deliver sufficient replenishment water through inlet pipe 50 or a break in an external portion of one of recirculation loops 30.

In addition to the drop in water level 46, the steam pressure within the vessel 12 may also decrease. Since saturation conditions prevail at this point in time, the lowered steam pressure will permit the coolant water to boil at a lower temperature. Accordingly, the temperature of the steam also decreases. Thus, steam at a temperature less than 540° F. and at a pressure lower than 1040 psi appears in steam dome 14 and consequently in steam exit line 52.

Unless the situation is corrected and reversed, water level 46 will eventually fall to the point where the upper portions of fuel bundles 40 are uncovered. When a substantial portion of fuel bundles 40 are exposed, the steam in contact with the exposed portion becomes superheated, i.e., its temperature rises above its saturation temperature at the prevailing steam pressure. As water level 46 continues to drop, the temperature of the steam in the nuclear reactor continues to increase. As this superheated steam rises into steam dome 14, it is tapped by steam line 52 which thus now contains superheated steam.

Figure 2:
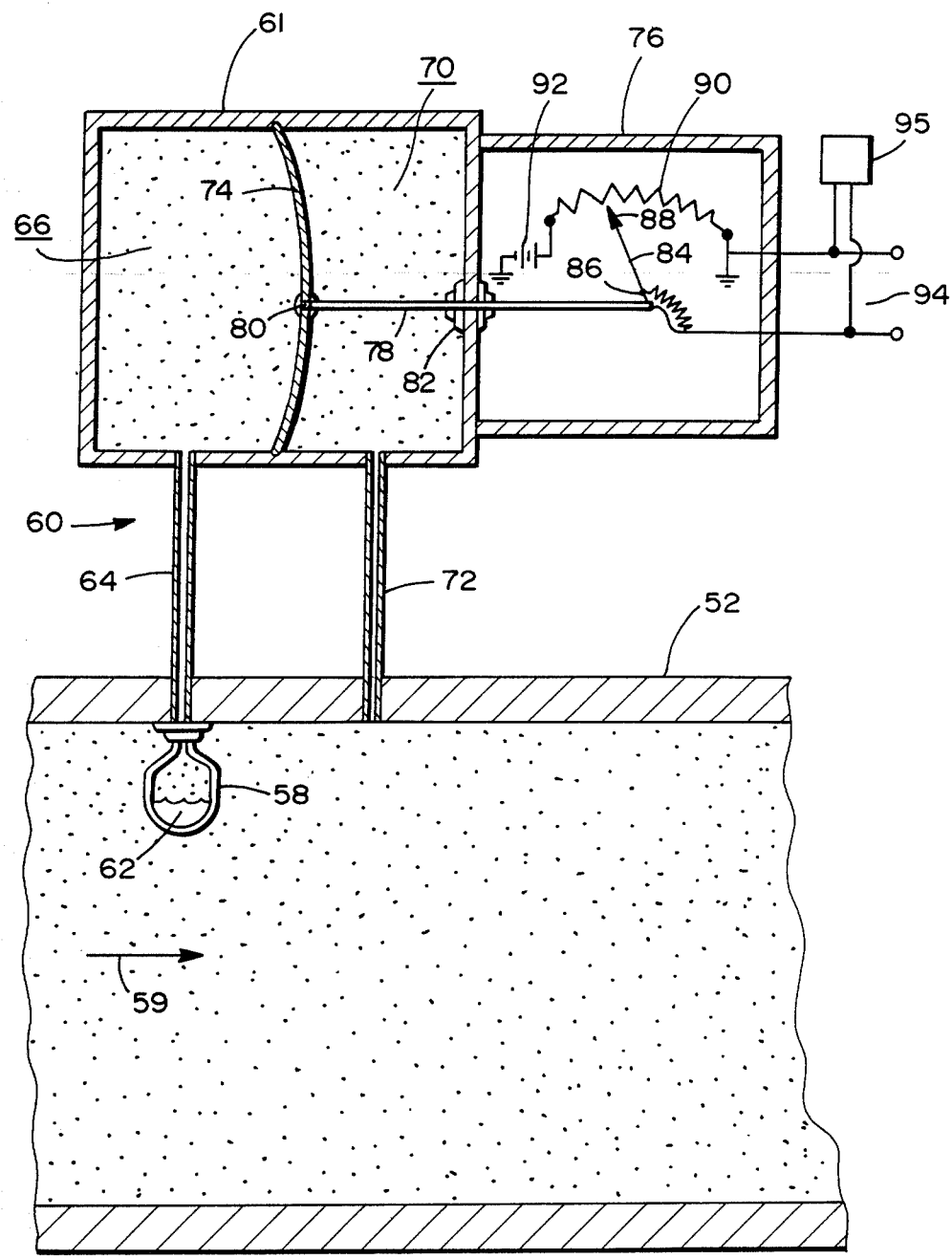
FIG. 2 is a detailed view, partially schematic, showing a closed system measuring device and a pressure comparator for use with the apparatus of FIG. 1.

In accordance with the present invention, a sensing bulb 58 of a closed system measuring device 60 is inserted into the steam exit line 52 of the nuclear reactor, as best shown in FIG. 2. The sensing bulb preferably is formed of stainless steel and is thus impervious to deterioration by the superheated radioactive steam 59 which passes across it. The sensing bulb contains a volatile liquid under pressure, e.g., water, as indicated at 62. A capillary tube 64 connects the sensing bulb to a comparator 61, specifically to an hermetically sealed first chamber portion 66 of a closed chamber defined by the comparator. Sensing bulb 58, capillary tube 64 and chamber portion 66 jointly form a closed system. As such, as long as the heat applied to bulb 58 is insufficient to vaporize all the water in the closed system, saturation conditions will prevail. If additional heat is applied to the bulb, the internal vapor pressure of the system increases correspondingly.

A second chamber portion 70 of comparator 61 is connected to steam exit line 52 by way of a capillary tube 72. Chamber portions 66 and 70 are hermetically isolated from each other by a flexible member 74 which is anchored to the walls of the comparator and which divides the chamber into the aforesaid chamber portions 66 and 70. Member 74 is shown in FIG. 2 displaced from its neutral position by being bowed to the right. The flexible member may take the form of a diaphragm, a membrane, bellows, or the like, capable of expanding one chamber portion at the expense of the other portion in accordance with the differential in the respective pressures transmitted via capillaries 64 and 72.

The displacement of diaphragm 74 due to the differential pressure is converted to an electrical signal by a transducer 76, of which different variations are commercially available. An example of a transducer is shown in FIG. 2 and is seen to include a linearly movable arm 78 which is anchored to diaphragm 74 at point 80. Arm 78 extends through the right-hand wall of the chamber into transducer 76. A seal 82 prevents the escape of steam from chamber portion 70 at the point where arm 78 protrudes through the chamber wall.

As shown, linearly movable arm 78 is linked to one end of a pivoted slider 84 of a potentiometer 90, located within transducer 76. Pivot 86 of slider 84 is preferably positioned off center, such that a relatively small linear movement of arm 78 due to the motion of diaphragm 74, will produce a magnified displacement at the opposite slider end 88. The latter is schematically illustrated as a pointer capable of traveling across the resistor of potentiometer 90. In practice, a variable inductance or other equivalent apparatus for converting the mechanical motion of arm 78 into a corresponding electrical signal may be substituted for potentiometer 90.

For the illustrated potentiometer arrangement, opposite ends of the resistor are connected to a battery 92 and to ground respectively. With this connection, a maximum DC output signal will be obtained at output terminals 94 when diaphragm 74 reaches its extreme right-hand position, i.e., when the vapor pressure developed in measuring device 60 is at a maximum relative to the tapped steam pressure in steam exit line 52. Conversely, the minimum DC output signal will occur when the tapped steam pressure, and hence the internal reactor pressure, maximally exceeds the vapor pressure in measuring device 60 so as to move diaphragm 74 to its extreme left hand position.

It will be obvious to those skilled in the art that the potentiometer may also be connected to ground through a center tap. In the latter case, the center tap will be connected to one of output terminals 94 and the potentiometer slider will be connected to the other output terminal. Opposite battery terminals will be connected to the opposite resistor ends. With the latter circuit, a signal of one or the opposite polarity will be provided at one of terminals 94, depending on the direction of displacement of slider 84 from its neutral position.

Although other volatile liquids may be used, liquid 62 in sensing bulb 58 preferably consists of water. In a preferred embodiment, the pressure in the closed measuring system exceeds atmospheric pressure at room temperature. Thus, when heat is applied to bulb 58, the resulting water vapor will be saturated. The closed system measuring device is preferably calibrated to provide an internal vapor pressure which is substantially equal, under normal operational conditions, to the tapped steam pressure in steam line 52.

As explained previously, the tapped steam pressure in steam line 52 differs only negligibly from the internal steam pressure in reactor vessel 12. The vapor pressure in the closed system measuring device, however, depends on the temperature of the exiting steam to which sensing bulb 58 is exposed. A direct physical comparison between the tapped steam pressure and the vapor pressure that corresponds to the reactor steam temperature is made by comparator 61. If there is a difference between the two pressures, a signal is provided at terminals 94, which may be further applied to a microprocessor for data processing. If the pressure differential exceeds a predetermined magnitude, an abnormal reactor condition is indicated. Such a condition may be further indicated by a warning device such as shown at 95 in FIG. 2, which is activated under the appropriate circumstances.

The present invention is primarily intended to monitor and provide warning of two specific, abnormal conditions that may develop when certain adverse events occur simultaneously in a boiling water nuclear reactor. The first situation involves a loss of coolant water, as mentioned hereinbefore, and a consequent drop in the reactor water level 46.

As water level 46 continues to drop, the upper portions of fuel bundles 40 eventually become exposed to the extent that superheating of the surrounding steam results. Thus, even through the pressure inside the nuclear reactor continues to decrease, the temperature of the steam in vessel 12, and hence in steam exit line 52, increases. This causes the internal vapor pressure in sensing bulb 58 to increase and hence the pressure in chamber portion 66 of comparator 61 becomes greater than the pressure in chamber portion 70. This pressure differential in turn causes slider 84 to move toward the left-hand end of the potentiometer resistor to provide a high DC output signal. When the pressure differential exceeds a predetermined amount, it indicates an abnormal condition in the reactor vessel and an abnormal drop in water level 46 can then be inferred.

A second situation which may cause the pressure in sensing bulb 58 to exceed the tapped steam pressure, is predicated on a multiple malfunction of reactor components which, although highly improbable, must nevertheless be considered as a possibility. For example, assume steam line 52 were to become blocked, e.g., due to a malfunction of the valve which controls the amount of steam being fed to the turbine. If simultaneously the valve controlling the amount of coolant water being fed into pressure vessel 12 by feedwater pipe 50 were to malfunction, a closed water/steam system would in effect be established in which the steam and water in the reactor vessel would seek an equilibrium where saturation conditions prevail. It is understood that this equilibrium in a boiling water nuclear reactor will not be reached until the pressure inside the nuclear reactor exceeds 1100 psi. In order to reach this equilibrium, both the temperature and the pressure of the steam in the reactor vessel will increase correspondingly as a result of the heat given off by the uncovered fuel.

As previously mentioned, pressure relief valve 28 allows the steam in the dome region to escape when a predetermined pressure threshold is reached. In the example under consideration, the threshold is set at 1100 psi so that the pressure in the steam dome will never exceed that value. As steam continues to be vented through relief valve 28 without replenishment of the depleted water, the fuel assembly will in time be uncovered and the temperature of the steam in dome region 18 and steam exit line 52 will continue to increase. The internal vapor pressure in device 60 will thus rise above the threshold level. As a consequence, the pressure in chamber portion 66 of comparator 61 will become greater than the pressure in chamber portion 70. Hence, a pressure differential will result which, once it reaches a predetermined amount, provides an indication to the operator that an abnormal condition exists in the reactor vessel.

From the foregoing discussion it will be clear that the present invention provides a method and apparatus for continuously and reliably monitoring the operation of a nuclear reactor from outside the reactor vessel for the existence of an abnormal reactor condition, such as a superheated condition. By extension, the invention provides a way of monitoring the level of the cooling water in a reactor, which method is separate and independent from the monitoring operation performed by the water level gauges in the downcomer region of the reactor vessel and it thus provides truely redundant monitoring.

The invention performs a temperature measurement of the reactor steam with direct reference to the reactor steam pressure. The apparatus used to perform this measurement is capable of withstanding radioactive steam at high temperatures without deterioration, degradation of performance, and without the necessity for frequent recalibration. The apparatus is located externally of the reactor where it is readily accessible and easily serviced.

While a preferred embodiment of the invention is disclosed herein for purposes of explanation, numerous changes, modifications, variations, substitutions and equivalents, in whole or in part, will be apparent to those skilled in the art to which the invention pertains. Accordingly, it is intended that the invention be limited only by the spirit and scope of the appended claims.

What is claimed is:

1. Apparatus for monitoring the operation of a boiling water nuclear reactor contained within a vessel externally of the latter, said reactor including a steam line extending from the reactor vessel for continuously tapping said reactor steam; said monitoring apparatus comprising:
    a fluid-holding closed system measuring device including, a comparator unit divided by a flexible diaphragm member into a sealed first chamber portion and a second chamber portion, a sensing bulb containing volatile liquid positioned within said steam line exposed to the steam contained therein and in fluid communication through a tube with the sealed first chamber portion of the comparator unit and forming a closed system therewith whereby pressure changes within the sensing bulb due to heat induced volatilization of its liquid contents are transferred through the closed system to the sealed first chamber portion of the comparator unit, said measuring device being adapted to develop an internal vapor pressure corresponding to the temperature of said tapped steam and being calibrated to provide a vapor pressure substantially equal to the tapped steam pressure under normal reactor operating conditions;
    means for comparing said internal vapor pressure directly with said tapped steam pressure comprising the second chamber of the comparator unit having a fluid communication through a tube in direct open contact with the interior of the steam line whereby superheated steam conditions in said steam line thermally induce increased vapor pressure in the exposed sensing bulb of the closed system and in turn the sealed first chamber portion of the comparator unit to displace the flexible diaphragm member dividing the comparator into a sealed first chamber and second chamber, said dividing diaphragm member having an arm affixed thereto for transferring its deflecting movement;
    and means responsive to said flexible diaphragm member and affixed arm movement of the comparing means for providing a signal corresponding to the differential between the directly compared pressures.

2. Monitoring apparatus in accordance with claim 1 and further including means for indicating a superheated reactor condition when said vapor pressure exceeds said tapped steam pressure by a predetermined amount.

3. Monitoring apparatus in accordance with claim 2, wherein said reactor further includes means for venting said reactor vessel when the internal steam pressure rises to a predetermined threshold;
    whereby a vapor pressure which exceeds said threshold by said predetermined amount indicates a superheated reactor condition.

4. Monitoring apparatus in accordance with claim 2, wherein said fluid consists of a volatile liquid under pressure, and wherein said sensing means includes a glass bulb containing said liquid, said glass bulb extending into said steam line and being substantially impervious to superheated steam in contact therewith.

5. Monitoring apparatus in accordance with claim 4, wherein said comparing means includes an enclosed chamber;
    a flexible member dividing said chamber into first and second chamber positions hermetically isolated from each other;
    means for ducting said tapped steam and the vapor from said volatile liquid to said first and second chamber portions respectively so as to apply said tapped steam pressure and said vapor pressure to opposite sides of said flexible member; and
    said signal providing means being adapted to generate an electrical output signal in response to the displacement of said flexible member from a neutral position.

6. A method for monitoring the operation of a boiling water nuclear reactor externally of the reactor vessel, said method comprising the steps of:
    tapping said reactor steam;
    exposing a fluid-holding, closed system measuring device containing volatile liquid to said tapped steam to develop an internal vapor pressure within the closed system corresponding to the temperature of said tapped steam, said device being calibrated to provide a vapor pressure substantially equal to the tapped steam pressure under normal reactor operating conditions.

7. A method in accordance with claim 6, wherein a superheated reactor condition is indicated when said vapor pressure exceeds said tapped steam pressure by said predetermined amount.

8. A method in accordance with claim 7, and further including the step of venting said reactor vessel when the reactor steam pressure rises above a predetermined threshold;

whereby a vapor pressure which exceeds said threshold by said predetermined amount indicates a superheated reactor condition.

9. A method for monitoring the water level in the core of a boiling water nuclear reactor independently of concurrent water level gauge measurements, said core being adapted to heat said water to produce steam in the reactor vessel; said method comprising the steps of:

exposing a fluid-holding, closed system measuring device containing volatile liquid to said steam externally of said reactor vessel, said device being adapted to develop an internal vapor pressure within the closed system corresponding to the temperature of said steam and being calibrated such that said vapor pressure is substantially equal to the pressure of said steam in said vessel under normal reactor operating conditions;

directly comparing said vapor pressure with said steam pressure externally of said vessel; and providing an indication of an abnormally low water level inside said core when said internal vapor pressure exceeds said steam pressure by a predetermined amount.

* * * * *